(12) United States Patent
Taylor et al.

(10) Patent No.: US 8,118,173 B2
(45) Date of Patent: Feb. 21, 2012

(54) STREAMER TRAP ASSEMBLY

(75) Inventors: Kevin Jude Taylor, Longview, TX (US); Richard Joel Perritt, Longview, TX (US)

(73) Assignee: Westlake Longview Corp., Houston, TX (US)

( * ) Notice: Subject to any disclaimer, the term of this patent is extended or adjusted under 35 U.S.C. 154(b) by 459 days.

(21) Appl. No.: 12/327,159

(22) Filed: Dec. 3, 2008

(65) Prior Publication Data
US 2010/0133152 A1    Jun. 3, 2010

(51) Int. Cl.
B07B 1/00 (2006.01)
(52) U.S. Cl. .................. 209/373; 209/264; 209/370
(58) Field of Classification Search .......... 209/21, 209/263, 264, 372, 373, 906
See application file for complete search history.

(56) References Cited

U.S. PATENT DOCUMENTS

| | | | |
|---|---|---|---|
| 1,351,861 A * | 9/1920 | Madsen | 209/370 |
| 3,756,405 A * | 9/1973 | Fenska | 209/44.2 |
| 3,948,764 A * | 4/1976 | Edwards | 209/30 |
| 4,067,800 A | 1/1978 | Young | |
| 4,202,761 A | 5/1980 | Holz | |
| 4,238,324 A | 12/1980 | Musselmann et al. | |
| 4,251,355 A | 2/1981 | Nelson et al. | |
| 4,424,632 A * | 1/1984 | Nakamura | 34/587 |
| 4,545,897 A | 10/1985 | Masuda | |
| 4,900,498 A | 2/1990 | Smith | |
| 4,952,309 A * | 8/1990 | King | 209/235 |
| 5,009,331 A | 4/1991 | Smith | |
| 5,123,543 A | 6/1992 | Stimpfl | |
| 5,186,332 A | 2/1993 | Hatton et al. | |
| 5,348,163 A | 9/1994 | Tunison, III et al. | |
| 5,458,245 A | 10/1995 | Heckel et al. | |
| 5,593,042 A | 1/1997 | Keller | |
| 6,004,404 A | 12/1999 | Ackerman | |
| 6,089,378 A | 7/2000 | Mascheretti et al. | |
| 6,712,216 B2 | 3/2004 | Van Oirschot | |
| 7,163,106 B2 | 1/2007 | Dal Maso | |
| 7,819,253 B2 * | 10/2010 | Borger et al. | 209/373 |
| 2002/0069985 A1 | 6/2002 | Rienecker et al. | |
| 2006/0163118 A1 | 7/2006 | Kelsey et al. | |
| 2007/0095727 A1 | 5/2007 | Bishop | |
| 2007/0199883 A1 | 8/2007 | Brettschneider et al. | |
| 2008/0223759 A1 * | 9/2008 | Schneider et al. | 209/143 |
| 2009/0145815 A1 * | 6/2009 | Schneider | 209/137 |
| 2009/0255857 A1 * | 10/2009 | Borger et al. | 209/370 |

FOREIGN PATENT DOCUMENTS
WO    2004111111 A1    12/2004

* cited by examiner

Primary Examiner — Joseph C Rodriguez
(74) Attorney, Agent, or Firm — Phan Law Group PLLC

(57) ABSTRACT

A streamer trap assembly for collecting streamers from a flow of polymer pellets includes a housing comprising an inlet, an outlet, and an opening bounded by a sealing surface; and a streamer trap positioned in the housing through the opening. The streamer trap comprises a screen sized to collect the streamers at the screen and to allow the polymer pellets to pass through the screen, a guide positioned to guide the flow of polymer pellets from the inlet to the screen and from the screen to the outlet, and a cover adapted to engage the sealing surface and cover the opening.

24 Claims, 6 Drawing Sheets

STREAMER TRAP ASSEMBLY

FIELD OF THE INVENTION

The present invention generally relates to a method and apparatus for removing contaminants from polymer pellets. In particular, the present invention relates to a method and apparatus for removing streamers from a flow of polymer pellets.

BACKGROUND OF THE INVENTION

A pneumatic conveying system is generally used to convey polymeric pellets, for example from a rail car or truck to a receiving container. When pneumatically conveying pellets, it is usually necessary to use a high transport velocity to prevent settling and to maintain movement of the pellets. Unfortunately, such a high transport velocity tends to cause frictional heat to build up as the pellets travel and contact a tube or conduit wall, and can cause melting of some of the pellets. The melted portions of the pellets can adhere to the tube or conduit wall in a thin polymeric layer, which can eventually break loose from the wall, travel with the pellets, and contaminate the process downstream. These thin strips of polymeric material, which are deposited on the walls of the tube or conduit by the moving pellets, are considered contaminants and are referred to by various names such as streamers, snakeskin, angel hair, etc.

Accordingly, a need exists for a method and apparatus that efficiently removes streamers from a flow of pellets.

SUMMARY OF THE INVENTION

The present invention solves the above need. In particular, the invention provides a streamer trap assembly for collecting streamers from a flow of polymer pellets. The assembly comprises a housing which comprises an inlet, an outlet, and an opening bounded by a sealing surface, and a streamer trap positioned in the housing through the opening. The streamer trap comprises a screen sized to collect the streamers at the screen and to allow the polymer pellets to pass through the screen, a guide positioned to guide the flow of polymer pellets from the inlet to the screen and from the screen to the outlet, and a cover adapted to engage the sealing surface and cover the opening.

The invention also provides a method of collecting streamers from a flow of polymer pellets. The method comprises providing a housing comprising an inlet, an outlet, and an opening bounded by a sealing surface, positioning a streamer trap in the housing through the opening, the streamer trap comprising a screen sized to collect the streamers at the screen and to allow the polymer pellets to pass through the screen, a guide positioned to guide the flow of polymer pellets from the inlet to the screen and from the screen to the outlet, and a cover adapted to engage the sealing surface and cover the opening, connecting the inlet to a supply of polymer pellets, and applying a vacuum to the outlet such that the polymer pellets proceed in the inlet, through the screen, and out the outlet, and such that the streamers are collected at the screen.

DETAILED DESCRIPTION OF THE PREFERRED EMBODIMENTS

Figure 1:
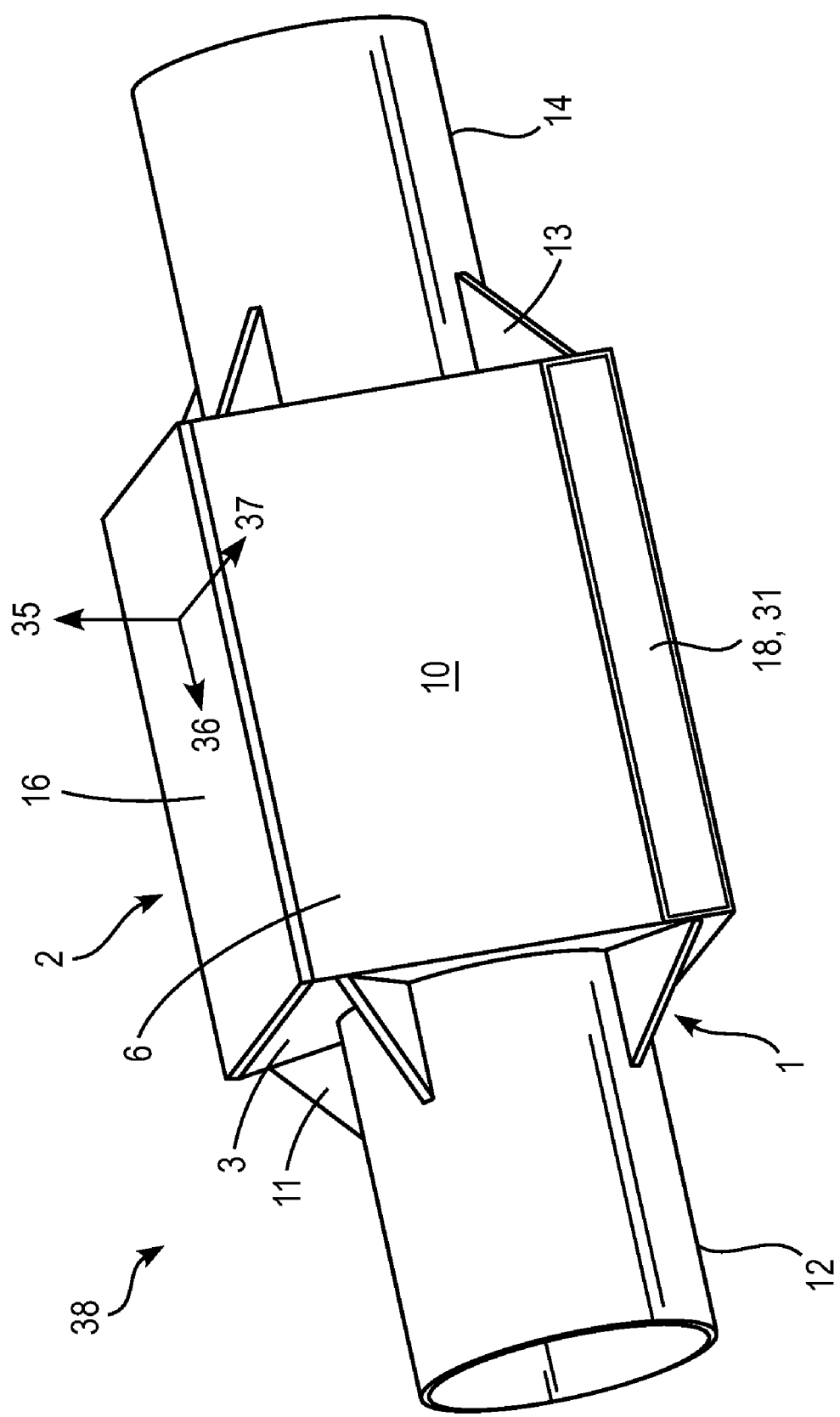
FIG. 1 is a perspective view of a streamer trap assembly according to an embodiment of the present invention.
Figure 3:
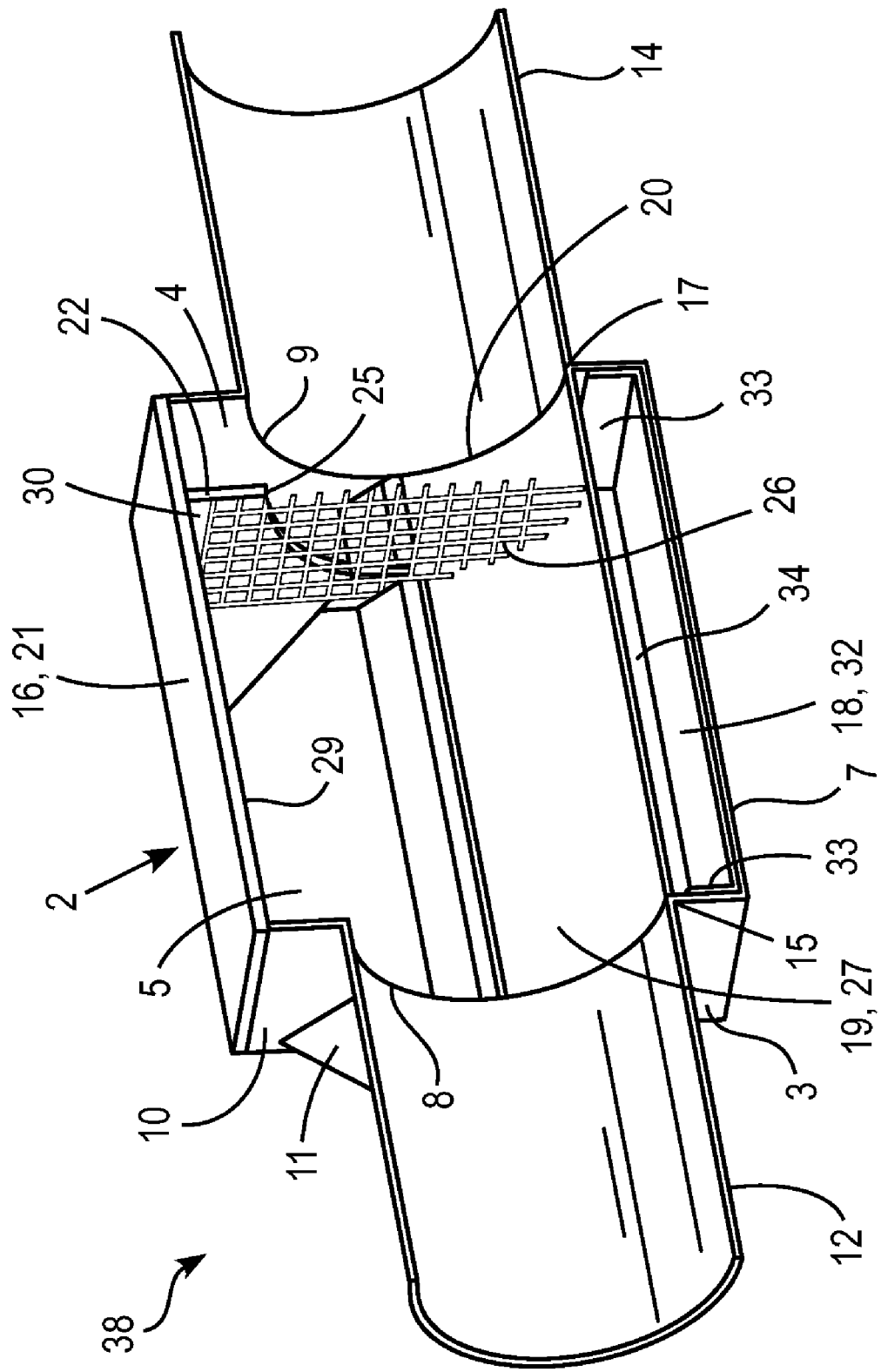
FIG. 3 is a cross-sectional perspective view of a streamer trap assembly according to an embodiment of the present invention.
Figure 6:
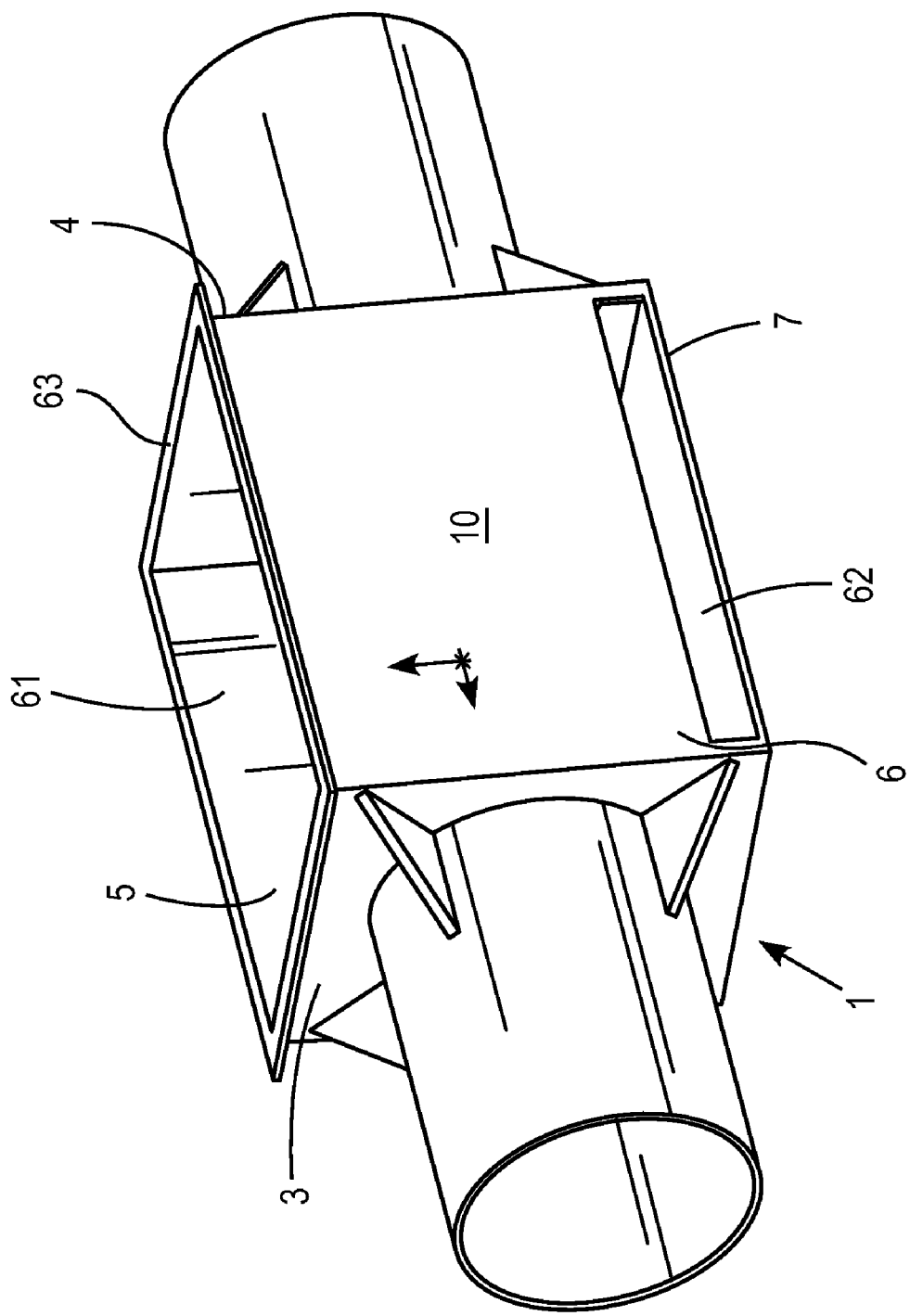
FIG. 6 is a perspective view of a streamer trap housing according to an embodiment of the present invention with the streamer trap and tray removed.

Referring to FIGS. 1, 3, and 6, housing 1 of the streamer trap assembly 38 comprises an oblong box 10 having first and second opposed rectangular sidewalls (3, 4), third and fourth opposed rectangular sidewalls (5, 6), a rectangular bottom wall 7, and a rectangular open top 61 opposed to the bottom wall 7 and defined by the top edges of each of the first through fourth sidewalls (3, 4, 5, 6). The first and second opposed sidewalls (3, 4) preferably have a width in the transverse direction 37 of about 8 inches and a height in the vertical direction 35 of about 10 inches. The third sidewall 5 preferably has a length in the longitudinal direction 36 of about 12 inches and a height in the vertical direction 35 of about 10 inches, and the fourth sidewall 6 preferably has a length in the longitudinal direction 36 of about 12 inches and a height in the vertical direction 35 slightly less than about 10 so that the fourth sidewall 6 defines an optional slot 62 in the oblong box 10 as discussed in more detail below. The bottom wall 7 is preferably about 8 inches wide in the transverse direction 37 and about 12 inches long in the longitudinal direction 36. The walls of the oblong box 10 are preferably aluminum plates welded together.

The first sidewall 3 includes a centrally located circular inlet opening 8. An inlet tube 12 is attached to the outer surface of the first sidewall 3 at the perimeter of the circular inlet opening 8, preferably by welding. The inlet tube 12 has an inside diameter approximately the same size as the diameter of the circular inlet opening 8. The inlet tube 12 is configured to connect with a polymer transport line such as the outlet of a rail car or truck or other storage or transportation facility. The connection may be made by slip fit or other connection mechanism. Preferably, four inlet tube braces 11 are equally spaced around the outer surface of the inlet tube 12 and are each attached to the inlet tube 12 and the first sidewall 3, preferably by welding. Each inlet tube brace 11 has a first edge attached to the outer surface of the first sidewall 3 and extending from the inlet tube 12 approximately toward a corner of the first sidewall 3, and a second edge attached to the outer surface of the inlet tube 12 and extending from the first sidewall 3 toward the free end of the inlet tube 12 in the longitudinal direction 36. The inlet tube 12 and inlet tube braces 11 are preferably made of aluminum.

The second sidewall 4 includes a centrally located circular outlet opening 9 that is axially aligned with and has approximately the same diameter as the circular inlet opening 8. An outlet tube 14 is attached to the outer surface of the second sidewall 4 at the perimeter of the circular outlet opening 9, preferably by welding. The outlet tube 14 has an inside diameter that is approximately the same size as the diameter of the circular outlet opening 9. The outlet tube 14 is configured to connect with a conduit that is operatively connected with a vacuum source. Four outlet tube braces 13 are equally spaced around the outer surface of the outlet tube 14 and are each attached to the outlet tube 14 and the second sidewall 4, preferably by welding. Each outlet tube brace 13 has a first edge attached to the outer surface of the second sidewall 4 and extending from the outlet tube 14 approximately toward a corner of the second sidewall 4, and a second edge attached to the outer surface of the outlet tube 14 and extending from the second sidewall 4 toward the free end of the outlet tube 14 in the longitudinal direction 36. The outlet tube 14 and outlet tube braces 13 are preferably made of aluminum.

The third sidewall 5 extends in the vertical direction 35 from the open top 61 to the bottom wall 7. The fourth sidewall 6 extends in the vertical direction 35 from the open top 61 to a position in the vertical direction 35 approximately flush with or slightly lower than the respective lowermost attachment points (15, 17) of the inlet tube 12 and the outlet tube 14 to the first and second sidewalls (3, 4). An optional slot 62 in the oblong box 10 is thereby defined by the lower edge of the fourth sidewall 6, an edge of the bottom wall 7, a lower portion of an edge of the first sidewall 3, and a lower portion of an edge of the second sidewall 4. The optional slot 62 allows an optional tray 18 to be removably received in the housing 1 as discussed in more detail below. In the case that the slot 62 and tray 18 are not desired, the fourth sidewall 6 can be extended in the vertical direction 35 from the open top 61 all the way to the bottom wall 7.

Figure 2:
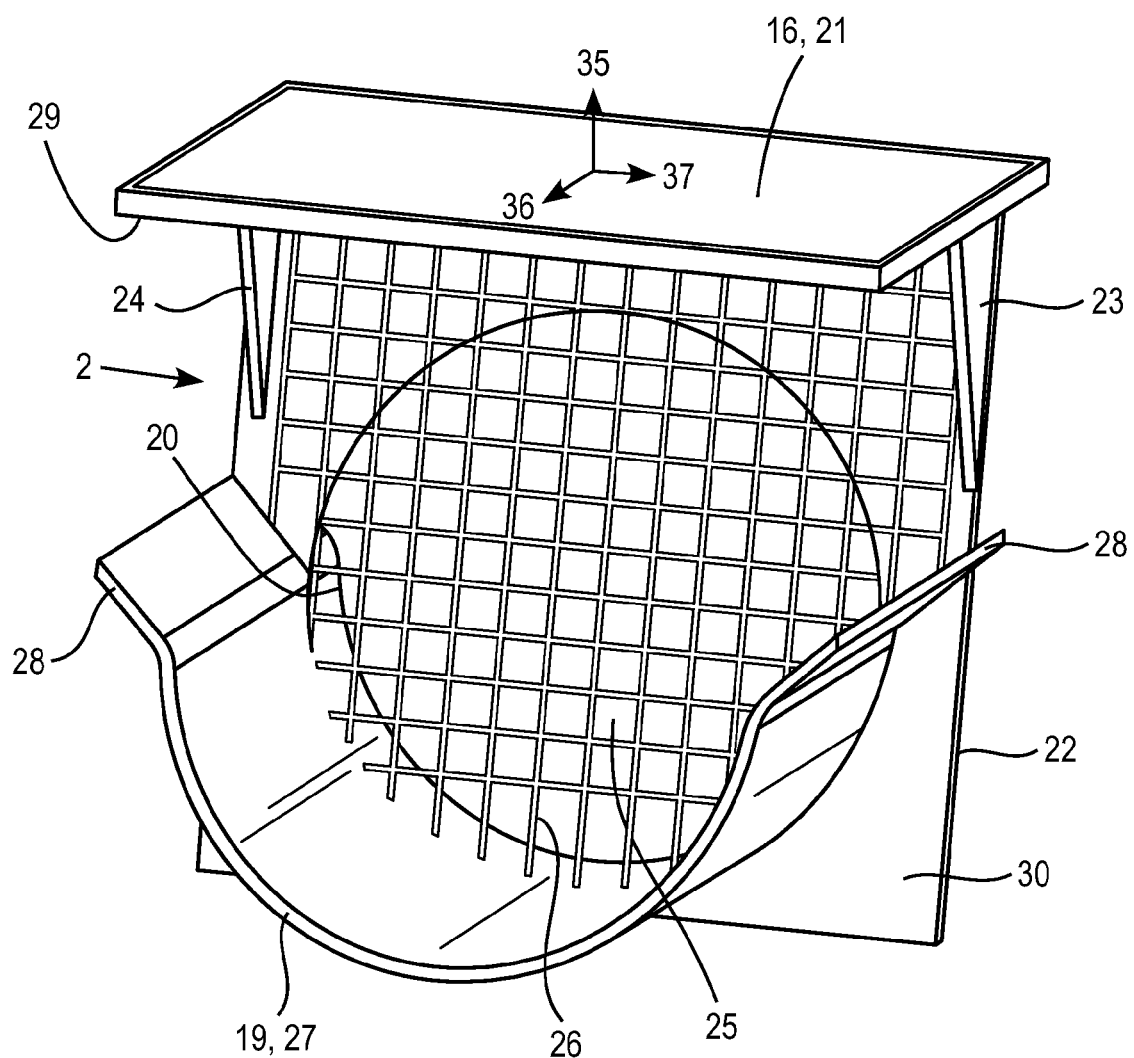
FIG. 2 is a perspective view of a streamer trap according to an embodiment of the present invention.

Referring to FIG. 2, streamer trap 2 of the streamer trap assembly 38 comprises a cover 16, a support plate 22 attached to the cover 16, a screen 26 attached to the support plate 22, and a guide trough 27 attached to the support plate 22. The streamer trap 2 is removably received in the housing 1 through the open top 61 as discussed in more detail below.

The cover 16 comprises a rectangular plate that is longer and wider by approximately 1 inch than the length and width of the open top 61. The dimensions of the cover 16 thus provide for about a ½-inch wide lip, which overhangs the perimeter of the open top 61. As seen from FIG. 6, the box 10 also can also have a lip 63 around the circumference of the open top 61. The lip on the cover 16 and the lip 63 on the box 10 allow for a good vacuum seal between the cover 16 and the housing 1. The cover 16 has a surface that faces away from the housing 1, i.e., an upper surface 21, and a surface that faces the housing, i.e., a lower surface 29. A gasket (not shown), preferably of rubber, plastic, or foam, may be attached at the perimeter of the lower surface 29 of the cover 16 and/or on the lip 63 of the open top 61 to provide for a vacuum-tight sealing engagement between the housing 1 and the cover 16. When the cover 16 is engaged with the open top 61, the position in the vertical direction 35 of the streamer trap 2 relative to the housing 1 is thus fixed.

A rectangular support plate 22 is perpendicularly attached to the lower surface 29 of the cover 16, such that the support plate 22 is directed downwardly in the vertical direction 35 into the housing 1. The support plate 22 extends downwardly from the cover 16 toward the bottom wall 7 in the vertical direction 35 to a position slightly lower in the vertical direction 35 than the respective lowermost attachment points (15, 17) of the inlet tube 12 and the outlet tube 14 to the first and second sidewalls (3, 4). The support plate 22 extends across the interior of the housing 1 in the transverse direction 37 approximately from the third sidewall 5 to the fourth sidewall 6. The support plate 22 is positioned such that it is between and parallel to both of the first and second sidewalls (3, 4), and is closer to the second sidewall 4 than the first sidewall 3. Two triangular support braces (23, 24) are preferably positioned proximate the fourth and third sidewalls (6, 5), respectively. The support braces (23, 24) each have an edge that is attached to and extends along the surface of the support plate 22 facing the first sidewall (hereinafter the support surface 30) in the vertical direction 35, and an edge that is attached to and extends along the lower surface 29 of the cover 16 in the longitudinal direction 36. The cover 16, support plate 22, and support braces (23, 24) are preferably aluminum plates attached to each other by welding.

Located in the support plate 22 is a circular support opening 25 that axially aligns with and is approximately the same diameter as the inlet and outlet openings (8, 9). A screen 26 is attached to the support surface 30 of the support plate 22 such that it completely covers the support opening 25. The screen 26 is preferably comprised of a crisscross of stainless steel strands that form a grid of square openings sized in the range of about ¼ inch×¼ inch to about 1 inch×1 inch. Preferably, the openings are about ½ inch×½ inch. The grid spacing is configured to be large enough that polymer pellets are allowed to pass through without deforming and small enough that the screen 26 collects the majority or most of streamers in the flow of polymer pellets. The screen 26 may be attached to the support plate 22 by any attachment means such as welding or bolts or both. In one embodiment, the screen 26 is welded to a flat piece of metal that is bolted onto the support plate 22. The support plate 22 may also include horizontally or vertically disposed bars (not shown) on the outlet side of the opening 25 to support the back side of the screen 26.

A guide trough 27, preferably of aluminum, is attached to the support plate 22, preferably by welding. The guide trough 27 resembles a tube split longitudinally approximately in half with a concave surface facing the open top. The guide trough 27 is positioned relative to the support plate 22 such that a primary portion 19 of the guide trough 27 extends in the longitudinal direction 36 from the support surface 30 to a position approximately flush with the first sidewall 3, and a secondary portion 20 of the guide trough 27 extends in the longitudinal direction 36 from the surface (not shown) of the support plate 22 facing the second sidewall 4 to a position approximately flush with the second sidewall 4, the primary and secondary portions (19, 20) thus fixing the position in the longitudinal direction 36 of the streamer trap 2 relative to the housing 1. The primary and secondary portions (19, 20) can either be unitary or separate. The guide trough 27 has a curvature that approximately aligns with and matches the respective lower halves of the curvatures of the support opening 25, inlet opening 8, outlet opening 9, inlet tube 12, and outlet tube 14. The guide trough 27 is attached to the support plate approximately at the lower half of the perimeter of the support opening 25. The two longitudinal free edges 28 of the guide trough 27 are flared outward such that they extend to a position approximately flush with the third and fourth sidewalls (5, 6), respectively, the outwardly flared edges 28 thus fixing the position in the transverse direction 37 of the streamer trap 2 relative to the housing 1. The flared edges 28 help to prevent polymer pellets from falling down under the guide trough 27.

Referring back to FIGS. 1, 3, and 6, removably positioned within housing 1 through the optional slot 62 is the optional tray 18. The tray 18 includes a rectangular catch plate 32 sized and positioned to rest upon and approximately overlap the entirety of the bottom wall 7 of the housing 1 when the tray 18 is positioned in the slot 62. The tray 18 also includes a rectangular outer wall 31. When the tray 18 is positioned in the slot 62, the outer wall 31 of the tray 18 lies approximately in the same plane as the fourth sidewall 6 of the housing 1, extends vertically from the catch plate 32 approximately to the bottom edge of the fourth sidewall 6, and extends longitudinally between lower portions of edges of the first sidewall 3 and the second sidewall 4. The tray 18 also includes side walls 33 and a rear wall 34 extending from side and rear edges of the catch plate 32 toward the open top 61 in the vertical direction 35. The tray 18 seals with the housing 1 in a vacuum-tight arrangement. The perimeter of the inner surface of the tray outer wall 31 and/or the perimeter of the slot 62 may be provided with a gasket to improve the seal around the slot 62.

Figure 4:
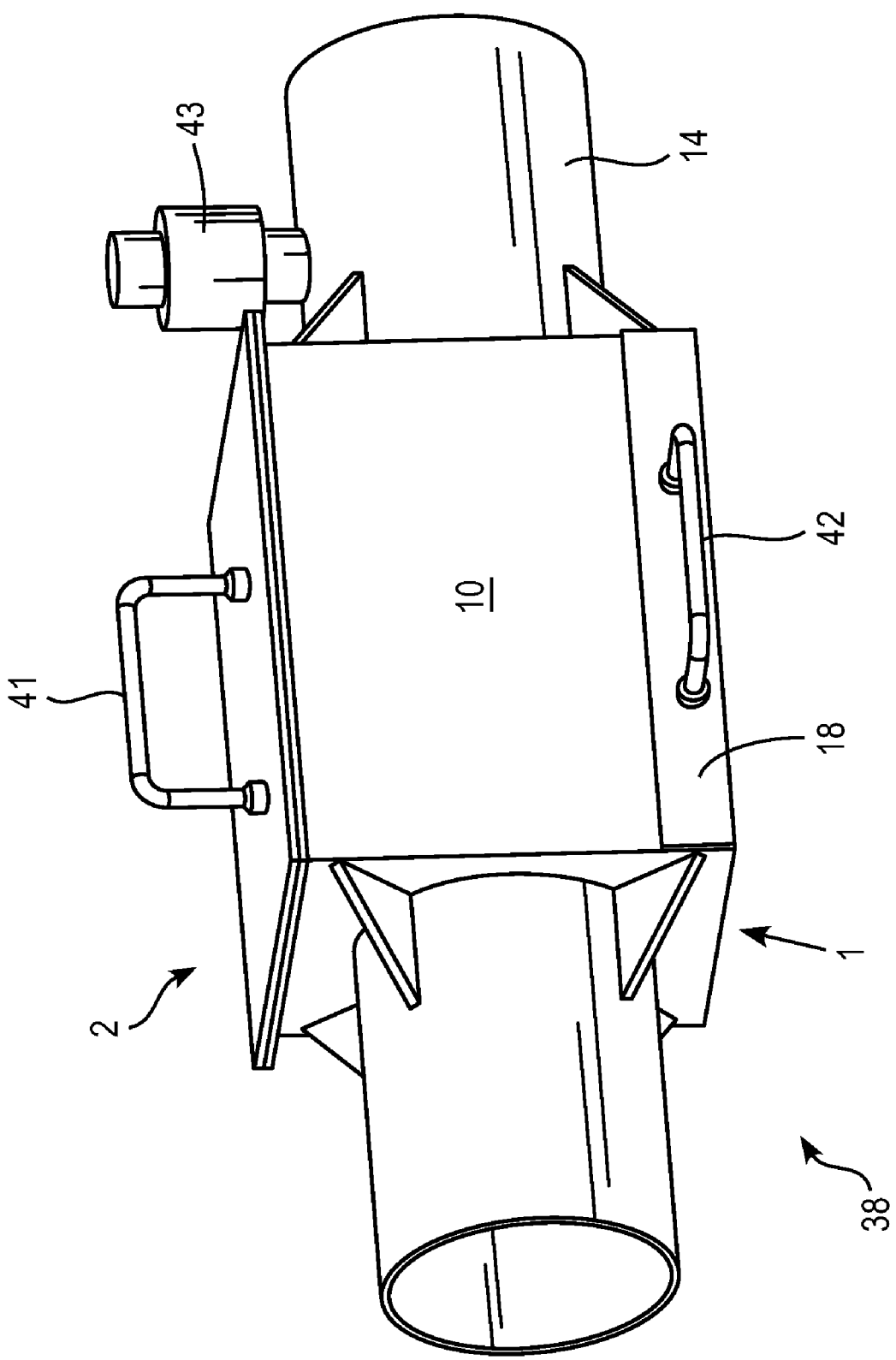
FIG. 4 is a perspective view of a streamer trap assembly according to another embodiment of the present invention.

FIG. 4 shows another embodiment of the streamer trap assembly 38 according to the invention. This embodiment is like the one shown in FIG. 1, except that it has a handle 41 attached to the cover 16 to facilitate removing the streamer trap 2 from the streamer trap housing 1, and a handle 42 attached to the tray 18 to facilitate removing the tray 18 from the housing 1. The handles 41 and 42 are preferably made of aluminum or steel and can be attached to the cover 16 and tray 18, respectively, by any attachment means such as welding, bolts, or screws. This embodiment also preferably incorporates a vacuum break 43 in outlet tube 14. The vacuum break 43 allows air to come into the outlet tube 14 if the vacuum is too high to prevent collapsing the downstream conveying tubes.

Figure 5:
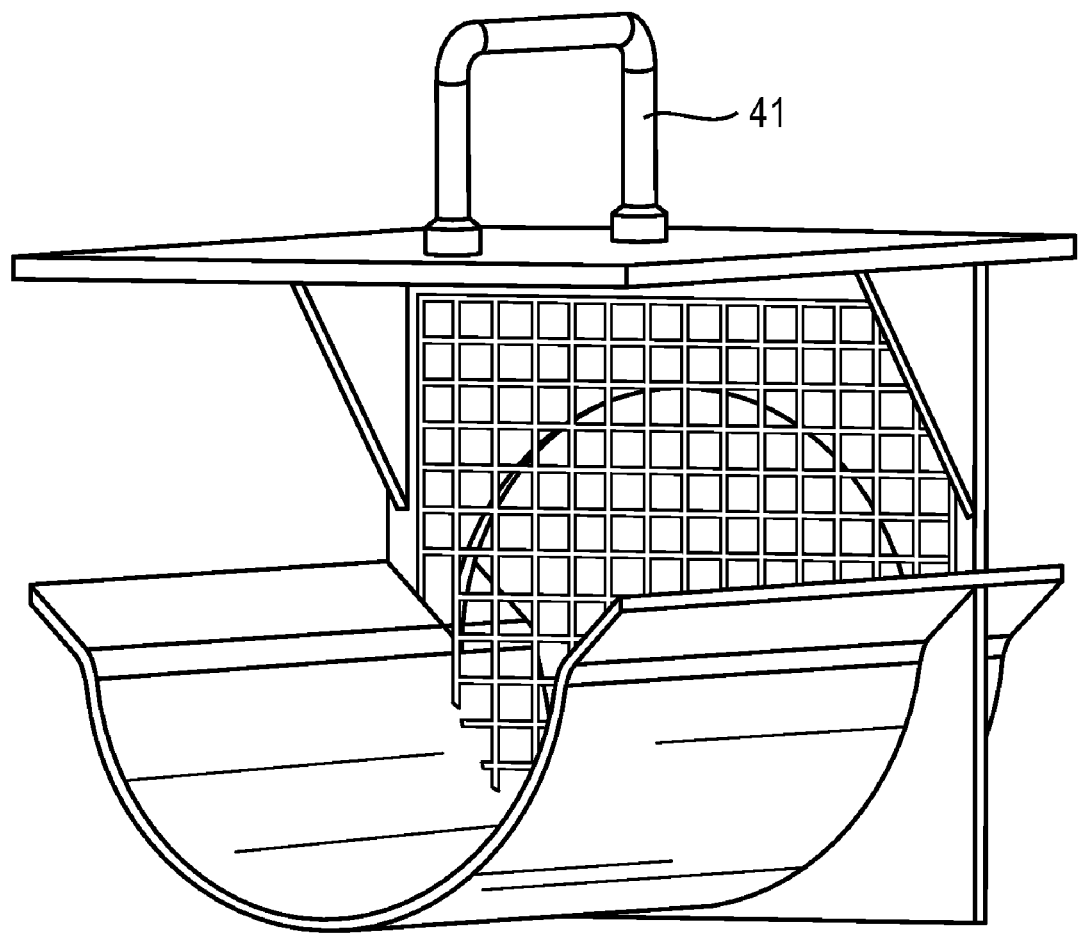
FIG. 5 is a perspective view of a streamer trap according to another embodiment of the present invention.

FIG. 5 shows the streamer trap from FIG. 4, which is like that of FIG. 2 except with handle 41, detached from the housing 1.

The streamer trap assembly 38 according to the invention can be operated as follows. With the streamer trap 2 and tray 18 in place in the housing 1, the inlet tube 12 is connected to a supply of polymer pellets, such as a container of a rail car. The outlet tube 14 is connected to a conduit that is operably connected to a vacuum source and that leads to a receiving container. The vacuum source is activated, and polymer pellets are pulled in the inlet tube 12, are guided by the guide trough 27 through the screen 26, and are pulled through the outlet tube 14 and into the receiving container. In the meantime, streamers in the flow of polymer pellets are collected at the screen 26.

When it is desired to remove the streamers collected at the screen 26, for example, after the desired amount of pellets has been received in the receiving container, or if the screen 26 has become clogged with streamers, the vacuum source is deactivated and the user manually removes the streamer trap 2 from the housing 1 so that the collected streamers can be removed from the screen 26 and subsequently discarded, separately collected for recycling, or otherwise disposed of as desired. While the streamer trap 2 is being removed from the housing 1, leftover polymer pellets which may have settled in the guide trough 27 are carried by the guide trough 27 out of the housing 1. Some of the leftover polymer pellets may fall off the guide trough 27 and back into the housing 1 during removal of the streamer trap 2, and these polymer pellets are caught in the tray 18, which can then also be removed from the housing 1. The leftover polymer pellets carried by the removed guide trough 27 and tray 18 can then be returned to the rail car, deposited with the delivered polymer pellets, or otherwise disposed of as desired.

The invention has been described in detail with particular reference to preferred embodiments thereof, but it will be understood that variations and modifications can be effected within the spirit and scope of the invention.

What is claimed is:

1. A streamer trap assembly for collecting streamers from a flow of polymer pellets, comprising:
    a housing comprising an inlet, an outlet, and an opening bounded by a sealing surface; and
    a streamer trap positioned in the housing through the opening, the streamer trap comprising a screen sized to collect the streamers at the screen and to allow the polymer pellets to pass through the screen, a guide positioned to guide the flow of polymer pellets from the inlet to the screen and from the screen to the outlet, and a cover adapted to engage the sealing surface and cover the opening.

2. The streamer trap assembly of claim 1, wherein the guide comprises a trough having at least one concave surface defining a curvature.

3. The streamer trap assembly of claim 2, wherein the curvature aligns with and matches respective curvature portions of the inlet and the outlet.

4. The streamer trap assembly of claim 2, wherein the at least one concave surface faces the opening.

5. The streamer trap assembly of claim 2, wherein the trough comprises:
    a primary trough portion positioned to guide the flow of polymer pellets from the inlet to the screen, and
    a secondary trough portion positioned to guide the flow of polymer pellets from the screen to the outlet.

6. The streamer trap assembly of claim 5, wherein the primary trough portion is longer than the secondary trough portion.

7. The steamer trap assembly of claim 1, wherein the cover comprises a gasket adapted to sealingly engage with the sealing surface such that the cover seals the opening.

8. The streamer trap assembly of claim 1, wherein the cover comprises a lip adapted to overhang the sealing surface.

9. The streamer trap assembly of claim 1, wherein the inlet comprises a tube adapted to be connected to a supply of polymer pellets.

10. The streamer trap assembly of claim 1, wherein the outlet comprises a tube adapted to be connected to a vacuum source.

11. The streamer trap assembly of claim 1, wherein the housing further comprises a slot positioned below the streamer trap.

12. The streamer trap assembly of claim 11, further comprising a tray removably received in the slot.

13. The streamer trap assembly of claim 1, wherein the screen comprises crisscrossed stainless steel strands.

14. A method of collecting streamers from a flow of polymer pellets, comprising:
    providing a housing comprising an inlet, an outlet, and an opening bounded by a sealing surface;
    positioning a streamer trap in the housing through the opening, the streamer trap comprising a screen sized to collect the streamers at the screen and to allow the polymer pellets to pass through the screen, a guide positioned to guide the flow of polymer pellets from the inlet to the screen and from the screen to the outlet, and a cover adapted to engage the sealing surface and cover the opening;
    connecting the inlet to a supply of polymer pellets; and
    applying a vacuum to the outlet such that the polymer pellets proceed in the inlet, through the screen, and out the outlet, and such that the streamers are collected at the screen.

15. The method of collecting streamers of claim 14, wherein the guide comprises a trough having at least one concave surface defining a curvature.

16. The method of collecting streamers of claim 15, wherein the curvature aligns with and matches respective curvature portions of the inlet and the outlet.

17. The method of collecting streamers of claim 15, wherein the at least one concave surface faces the opening.

18. The method of collecting streamers of claim 14, wherein the trough comprises:
    a primary trough portion positioned to guide the flow of polymer pellets from the inlet to the screen, and
    a secondary trough portion positioned to guide the flow of polymer pellets from the screen to the outlet.

19. The method of collecting streamers of claim 18, wherein the primary trough portion is longer than the secondary trough portion.

20. The method of collecting streamers of claim 14, wherein the cover comprises a gasket adapted to sealingly engage with the sealing surface such that the cover seals the opening.

21. The method of collecting streamers of claim 14, wherein the cover comprises a lip adapted to overhang the sealing surface.

22. The method of collecting streamers of claim 14, further comprising:
    removing the streamer trap from the housing; and
    removing the collected streamers from the streamer trap.

23. The method of collecting streamers of claim 22, further comprising:
    providing a tray in a slot positioned in the housing below the streamer trap;
    during the streamer trap removal step, catching in the tray polymer pellets that fall into the housing;
    removing the tray from the slot; and
    removing from the tray polymer pellets that are caught in the tray.

24. The method of collecting streamers of claim 14, wherein the screen comprises crisscrossed stainless steel strands.

* * * * *